United States Patent [19]

Robinson

[11] Patent Number: 4,463,141

[45] Date of Patent: Jul. 31, 1984

[54] POLYETHER CARBONATE DIOLS AND POLYURETHANES PREPARED THEREFROM

[75] Inventor: Ivan M. Robinson, Wilmington, Del.

[73] Assignee: E. I. Du Pont de Nemours and Company, Wilmington, Del.

[21] Appl. No.: 460,570

[22] Filed: Jan. 24, 1983

Related U.S. Application Data

[63] Continuation of Ser. No. 326,042, Nov. 30, 1981, abandoned.

[51] Int. Cl.³ .................... C08L 75/08; C08G 71/04
[52] U.S. Cl. .................................. 525/467; 260/463; 525/460; 528/76; 528/370; 528/372
[58] Field of Search ............... 528/372, 417, 370, 76; 525/467, 460; 260/463

[56] References Cited

U.S. PATENT DOCUMENTS

| | | | |
|---|---|---|---|
| 3,544,524 | 12/1970 | Müller et al. | 525/467 |
| 4,131,731 | 12/1978 | Lai et al. | 525/467 |
| 4,217,437 | 8/1980 | Schreckenberg et al. | 528/171 |
| 4,264,752 | 4/1981 | Watson, Jr. | 525/467 |

OTHER PUBLICATIONS

W. H. Carothers 2nd F. J. Van Natta, J.A.C.S. 52 (1930) pp. 314–326.

*Primary Examiner*—Theodore E. Pertilla

[57] ABSTRACT

Polyether carbonate diols are prepared by coupling segments of a poly(tetramethylene ether) glycol with a dialkyl carbonate, a cyclic carbonate or with phosgene. The carbonate diols are useful in preparing polyurethanes.

6 Claims, No Drawings

POLYETHER CARBONATE DIOLS AND POLYURETHANES PREPARED THEREFROM

This is a continuation of application Ser. No. 326,042, filed Nov. 30, 1981, now abandoned.

DESCRIPTION

1. Technical Field

This invention relates to polyether carbonate diols. It is more particularly directed to such diols made by coupling up to twenty poly(tetramethylene ether) glycol (PTMEG) segments with a dialkyl carbonate or phosgene.

The invention also relates to polyurethanes made with these polyether carbonate diols.

2. Summary of the Invention

The diols of the invention are represented by the structure

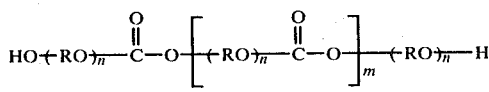

where
R is $-CH_2-_4$
n is 7-45 and
m is 0-18.

In a preferred embodiment, n and m are 9-40 and 0-10, respectively.

The polyether carbonate diols of the invention have lower crystalline melting points, better resistance to thermal degradation and are more stable against color change at high temperatures than PTMEG's of comparable molecular weight.

DETAILED DESCRIPTION OF THE INVENTION

The polyether carbonate diols of the invention can be made by catalytically reacting a suitable PTMEG with a dialkyl carbonate, a cyclic carbonate, or with phosgene.

The PTMEG starting material will have a number average molecular weight of 500-3000, preferably 650-2900. Number average molecular weight is determined by first determining the hydroxyl number of the sample by titrating it with acetic anhydride according to ASTM-D-1638 and then converting this number to number average molecular weight according to the formula molecular weight = $(56,000 \times n)$/hydroxyl number where n is the hydroxyl functionality of the sample.

The PTMEG can be any of these commercially available, or can be prepared by any of the well-known methods of catalytically polymerizing tetrahydrofuran.

The dialkyl carbonate coupling agents which can be used are those whose alkyl groups contain 1-4 carbon atoms. Dimethyl- and diethyl carbonate are preferred. The cyclic carbonate coupling agents are those whose rings contain 2 or 3 carbon atoms. The coupling agent, whether it be a dialkyl carbonate, a cyclic carbonate or phosgene, can be of any customary grade available in the marketplace.

The amounts of PTMEG and coupling agent used are of course governed by the molecular weight desired in the diol product, and will be such that one mole more of PTMEG will be used than of coupling agent. When the coupling agent used is a dialkyl carbonate, some of it may be removed from the reaction mass along with byproduct alcohol. This loss should be compensated for.

The catalyst used can be any of the conventional ester interchange catalysts. Tetrabutyl titanate is preferred. The catalyst may be employed at a concentration of 0.0001-0.1%, by weight, of the reaction mass.

The reaction can be carried out in bulk, using PTMEG itself as the reaction medium. When a dialkyl carbonate or a cyclic carbonate is used as the coupling agent, the carbonate and the catalyst are added directly to the medium. The reaction can be carried out at a temperature of 120°-240° C. and at atmospheric pressure. In a preferred method, the carbonate is slowly added to the PTMEG over a 5-20 hour period. Byproduct alcohol can be removed from the reaction mass by vaporization or by sweeping the reaction zone with nitrogen.

When a polyether carbonate diol having the desired molecular weight has been obtained, as determined by periodic sampling and analysis, the catalyst is deactivated by the well-known method of adding phosphoric acid.

When phosgene is used as the coupling agent, the reaction is conducted in basically the same way, varying only in that lower reaction temperatures are used, viz., 0°-150° C., and a base acceptor is added to the reaction mass to neutralize the byproduct hydrochloric acid.

The resulting polyether carbonate diol will have a number average molecular weight of 1000-12,000, preferably 1000-5000, the actual molecular weight of course depending on the molecular weight of the starting material and the number of segments coupled, and will have a crystalline melting point of 14°-24° C.

A polyurethane can be prepared from such a polyether carbonate diol by reacting it with an organic polyisocyanate and an aliphatic polyol or polyamine chain extender, as is well known in the art.

The polyisocyanates used in preparing the polyurethanes can be any of the aliphatic or aromatic polyisocyanates ordinarily used to prepare polyurethanes. Illustrative are 2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4'-diisocyanate
xylylene diisocyanate
hexahydro xylylene diisocyanate
dicyclohexylmethane-4,4'-diisocyanate
1,4-benzene diisocyanate
3,3'-dimethoxy-4,4'-diphenyl diisocyanate
m-phenylene diisocyanate
isophorone diisocyanate
polymethylene polyphenyl isocyanate
4,4'-biphenylene diisocyanate
4-isocyanatocyclohexyl-4'-isocyanatophenyl methane
p-isocyanatomethyl phenyl isocyanate.

Mixtures of isocyanates can also be used.

The chain extenders used in preparing the polyurethanes can be any of the aliphatic polyols, or any of the aliphatic or aromatic polyamines ordinarily used to prepare polyurethanes.

Illustrative of the aliphatic polyols which can be used as chain extenders are 1,4-butanediol
ethylene glycol
1,6-hexanediol
glycerine
trimethylolpropane
pentaerythritol
1,4-cyclohexane dimethanol
phenyl diethanolamine Diols like hydroquinone bis($\beta$-hydroxyethyl)ether, tetrachlorohydroquinone-1,4-bis($\beta$-hydroxyethyl) ether and tetrachlorohydroquinone-1,4-bis($\beta$-hydroxyethyl) sulfide, even though they contain aromatic rings, are considered to be aliphatic polyols for purposes of the invention.

Mixtures of diols can also be used.

Illustrative of the polyamines which can be used as chain extenders are p,p'-methylene dianiline and complexes thereof with alkali metal chlorides, bromides, iodides, nitrites and nitrates.
4,4'-methylene bis(2-chloroaniline)
dichlorobenzidine
piperazine
2-methylpiperazine
oxydianiline
hydrazine
ethylenediamine
hexamethylenediamine
xylylenediamine
bis(p-aminocyclohexyl)methane
dimethyl ester of 4,4'-methylenedianthranilic acid
p-phenylenediamine
m-phenylenediamine
4,4'-methylene bis-(2-methoxyaniline)
4,4'-methylene bis(N-methylaniline)
2,4-toluenediamine
2,6-toluenediamine
benzidine
3,4'-dimethylbenzidine
3,3'-dimethoxybenzidine
dianisidine
1,3-propanediol bis(p-aminobenzoate)
isophorone diamine
1,2-bis(2'-aminophenylthio)ethane
3,5-diethyl toluene-2,4-diamine
3,5-diethyl toluene-2,6-diamine Mixtures of amines can also be used.

The polyurethanes can be prepared in two steps, the first of which is conducted under nitrogen at ambient pressure to prevent oxidation of the reactants and product, and to prevent exposure of the reaction mass to atmospheric moisture. In the first step, the polyether carbonate diol starting material is dried by heating it at a temperature of 80°–100° C. under vacuum, and is then held at 60°–125° C., preferably about 70°–90° C., while a stoichiometric excess, preferably twofold to tenfold, of organic diisocyanate is added, with stirring. The actual amount of isocyanate used depends on the molecular weight of the polyether carbonate diol, as is well known in the art. The reaction mass is held for about 1–4 hours at 60°–125° C., with stirring, and the free isocyanate content of the mass is then determined by titrating it with di-n-butylamine, as described in Analytic Chemistry of the Polyurethanes, Volume XVI, Part III, D. J. David and H. B. Staley, Wiley-Interscience, 1969, pages 357–359.

In the second step, an amount of polyamine or polyol chain extender calculated to give an isocyanate/hydroxyl or amine mole ratio of about 0.9–1.1 to 1 in the reaction mass, preferably 1–1.05/1, is added to the reaction mass.

A conventional curing catalyst can be added at this point if desired. Illustrative of catalysts which can be used are dibutyltin dilaurate and stannous octoate. The catalyst can be added to the reaction mass to give a concentration of about 0.001–0.1%, by weight, preferably about 0.01%.

The reaction mass is held with stirring at 60°–130° C. until it is homogeneous, which normally takes 1–5 minutes. The mass is then poured into molds preferably preheated to 100°–120° C., and then cured at about 100°–120° C. at a pressure of 1700–2500 kPa for from 5 minutes to several hours. The casting is then cooled, removed from the mold, aged for about one week at ambient temperature, and is then ready for use.

EXAMPLES

In the following examples, all parts are by weight.

Example 1 (Best Mode)

Into a reaction vessel were charged 500 parts of PTMEG, number average molecular weight 650, 0.0025 part of tetrabutyl titanate dissolved in 10 ml of tetrahydrofuran, and 10 parts of diethyl carbonate.

This mixture was heated to and held at 210°–240° C., with stirring, while a total of 72 parts of diethyl carbonate were added at the rate of 0.2 part per minute. By-product ethanol was removed from the mass by distillation.

Residual ethanol and unreacted carbonate were then removed from the mass at a pressure of 133–267 Pa (1–2 mm of Hg) and the catalyst deactivated by adding to it a small amount of 85% $H_3PO_4$.

The resulting product had a number average molecular weight of 1950.

Example 2

(A) A product like that of Example 1, 136.8 parts, was charged to a polymerization kettle and dried by heating it at 80° C. for 30 minutes at a pressure of 2000 Pa.

The dried product was then held at 80° C. while 56.25 parts of molten diphenylmethane-4,4'-diisocyanate were added thereto. The kettle was then purged with nitrogen and the reaction mass held at 80° C. for two hours, with stirring, to give a product having a free isocyanate content of 7.49%.

This product, 185 parts, was then heated at 80° C. for 30 minutes at a pressure of 2000 Pa to remove entrapped air.

(B) 1,4-Butanediol, 14.1 parts, was added, with stirring, to the product of (A) held at 80° C. This reaction mixture was then held at 80° C., with stirring for 4 minutes.

The mixture was then poured into a mold preheated to 110° C., which was then pressed in a platen press at 110° C. and a platen pressure of 2155 kPa for 17 hours. The resulting elastomeric material was held for one week at ambient temperature and was then ready for use.

I claim:

1. A polyether carbonate diol represented by the structure

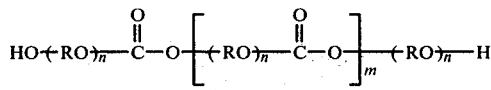

where
R is —CH$_2$—$_4$
n is 7–45, and
m is 0–18.

2. The diol of claim 1 where n is 9–40 and m is 0–10.

3. A polyurethane which is the reaction product of
(A) a diol of claim 1,
(B) an organic polyisocyanate, and
(C) a chain extender, 4. The polyurethane of claim 3 wherein the polyisocyanate is diphenylmethane-4,4'-diisocyanate or a toluene diisocyanate.

5. The polyurethane of claim 3 wherein the chain extender is an aliphatic polyol, an aliphatic polyamine or an aromatic polyamine.

6. The polyurethane of claim 5 wherein the chain extender is an aliphatic diol of 2–10 carbon atoms.

* * * * *